US010202987B2

(12) United States Patent
Strobel

(10) Patent No.: US 10,202,987 B2
(45) Date of Patent: Feb. 12, 2019

(54) VALVE ASSEMBLY HAVING DUAL FUNCTIONALITY FOR DIRECTIONAL CONTROL OF A PISTON ON A FLUID ACTUATED DEVICE

(71) Applicant: Dresser, Inc., Addison, TX (US)

(72) Inventor: Lee Richard Strobel, Chicago, IL (US)

(73) Assignee: Dresser, LLC, Addison, TX (US)

(*) Notice: Subject to any disclaimer, the term of this patent is extended or adjusted under 35 U.S.C. 154(b) by 645 days.

(21) Appl. No.: 14/269,919

(22) Filed: May 5, 2014

(65) Prior Publication Data

US 2015/0020905 A1    Jan. 22, 2015

Related U.S. Application Data

(60) Provisional application No. 61/856,177, filed on Jul. 19, 2013.

(51) Int. Cl.
  *F15B 13/04*   (2006.01)
  *F16K 31/14*   (2006.01)
  *F15B 13/043*  (2006.01)

(52) U.S. Cl.
  CPC ...... *F15B 13/0402* (2013.01); *F15B 13/0431* (2013.01); *F16K 31/14* (2013.01);
  (Continued)

(58) Field of Classification Search
  CPC .................. F15B 13/04; F15B 13/0402; F15B 2013/041; F15B 2013/0412
  (Continued)

(56) References Cited

U.S. PATENT DOCUMENTS 442,475 A    12/1890  Blackwell
3,315,702 A   4/1967  Passaggio
(Continued)

FOREIGN PATENT DOCUMENTS

CN      101886709      5/2013
GB      2248910 A      4/1992
WO   WO-2006110148   10/2006

OTHER PUBLICATIONS

International Search Report and Written Opinion issued in connection with corresponding PCT Application No. PCT/US2014/047013 dated Nov. 13, 2014.

*Primary Examiner* — Craig Schneider
*Assistant Examiner* — Daniel P Donegan
(74) *Attorney, Agent, or Firm* — Paul Frank + Collins P.C.

(57) ABSTRACT

Embodiments of a directional valve assembly that provides a single device with functionality of a two-position design for automated operation and functionality of a three-position design for manual operation. The embodiments can include a housing with a piston chamber and a spool member that transits in the housing to regulate the flow of a working fluid to a cylinder. The embodiments can also have one or more pilot operators that regulate the flow of pilot air into the piston chamber to move the spool member between two positions, i.e., two open positions. The embodiments can also have a manual operator (e.g., a lever) that can move the spool to the open positions and to a closed position. In one embodiment, the spool member is configured to remain in either a first position, a second position, or a third position in the absence of an outside stimulus on the pilot operators.

20 Claims, 3 Drawing Sheets

(52) U.S. Cl.
CPC .................. *F15B 2013/0412* (2013.01); *Y10T 137/86582* (2015.04); *Y10T 137/86614* (2015.04)

(58) Field of Classification Search
USPC ............. 137/625.69, 625.25, 625.67, 625.64
See application file for complete search history.

(56) References Cited

U.S. PATENT DOCUMENTS

| | | | |
|---|---|---|---|
| 3,434,390 A | 3/1969 | Weiss | |
| 3,523,555 A | 8/1970 | Padula | |
| 3,554,234 A | 1/1971 | Kurtz | |
| 3,556,154 A * | 1/1971 | Kramer | F15B 13/043 137/625.64 |
| 3,756,280 A * | 9/1973 | Parquet | F15B 13/04 137/625.25 |
| 3,771,565 A | 11/1973 | Padula | |
| 4,011,891 A | 3/1977 | Knutson et al. | |
| 4,122,868 A * | 10/1978 | Holloway | F16K 11/0708 137/625.3 |
| 4,185,660 A | 1/1980 | Faix | |
| 4,215,723 A * | 8/1980 | Ichiryu | F15B 13/0402 137/625.63 |
| 4,266,572 A | 5/1981 | Schuttenberg et al. | |
| 4,270,575 A * | 6/1981 | Reed | B65G 53/4616 137/625.69 |
| 4,274,443 A * | 6/1981 | Faix | F15B 13/0402 137/625.6 |
| 4,282,901 A * | 8/1981 | Satoh | F15B 13/0433 137/625.64 |
| 4,616,675 A | 10/1986 | Amrhein | |
| 4,627,468 A * | 12/1986 | Wilke | G05G 5/02 137/625.64 |
| 5,317,953 A * | 6/1994 | Wentworth | F15B 13/0422 137/596 |
| 5,505,593 A | 4/1996 | Hartley et al. | |
| 5,623,968 A | 4/1997 | Thorp | |
| 6,583,435 B2 | 6/2003 | Burkhardt | |
| 7,516,758 B2 | 4/2009 | Huynh et al. | |
| 7,980,269 B2 * | 7/2011 | Fry | B61D 7/28 137/625.69 |
| 2005/0236053 A1 * | 10/2005 | Miyazoe | F15B 13/0817 137/625.64 |
| 2007/0261747 A1 * | 11/2007 | Huynh | F15B 13/0401 137/625.69 |
| 2012/0024407 A1 * | 2/2012 | Kormanik | F16K 11/0716 137/625.69 |
| 2012/0132428 A1 | 5/2012 | Polyntsev | |
| 2013/0139919 A1 | 6/2013 | Dennis et al. | |
| 2015/0020905 A1 * | 1/2015 | Strobel | F15B 13/0431 137/625.64 |

* cited by examiner

VALVE ASSEMBLY HAVING DUAL FUNCTIONALITY FOR DIRECTIONAL CONTROL OF A PISTON ON A FLUID ACTUATED DEVICE

CROSS-REFERENCE TO RELATED APPLICATIONS

This application claims the benefit of priority to U.S. Provisional Patent Application No. 61/856,177, filed on Jul. 19, 2013, and entitled "Valve Device." The content of this application is incorporated herein by reference in its entirety.

BACKGROUND

The subject matter disclosed herein relates to valves and valve technology with particular discussion below that describes configurations of a valve assembly to provide automated and manual control of the position of a piston rod of a fluid-actuated device.

Many fluid systems incorporate a valve assembly to regulate fluid flow from a fluid supply to an actuator or like device. Systems with fluid-based actuators, e.g., hydraulic and pneumatic cylinders, may use the valve assembly to control the flow of working fluid to a cylinder. During operation, the working fluid flows into the cylinder to displace a piston rod to perform useful work, e.g., to move a load. In some applications, the actuator comprises a double-acting cylinder with two separate fluid inlets that are associated with a direction of travel of the piston rod.

Directional control valves are one type of valve assembly suitably configured to interface with the actuator to operate the cylinder. Valve assemblies of this type, also known as "spool valves," have a housing with an inlet port that couples with a fluid supply and one or more outlet ports that couple with the fluid inlets on the cylinder. The spool valve can also have a moveable element (or "spool") that translates to different positions in the housing. In some configurations, the spool valve is outfit with solenoids and/or a manual lever to move the spool. These devices can permit automatic operation and manual operation of the cylinder, as desired.

The position of the spool regulates the flow of the working fluid from the inlet port to the outlet ports to influence the direction of travel of the piston rod of the cylinder. The positions include open positions and closed positions. The open positions direct the working fluid from the spool valve to a first side of a piston coupled with the piston rod. In the open positions, the working fluid exhausts from a second side of the piston. The closed positions prevent flow and exhaust of working fluid to and from either side of the piston.

Conventional designs often utilize combinations of the open positions and the closed positions to obtain certain functionality for the spool valves. Two-position designs have two open positions for the spool. Movement of the spool between these open positions causes the piston rod to move between a maximum travel and a minimum travel. In three-position designs, the spool valve incorporates a closed position interposed between the two open positions. Locating the spool in this closed position can be used to control the travel of the piston rod, for example, to hold the piston rod at an intermediate travel between the minimum travel and the maximum travel.

Design specifications for a fluid system may mandate that the spool valve have different functionality for manual operation and automatic operation of the cylinder. For example, the specifications may call for a spool valve with functionality of the three-position design for manual operation and with functionality of the two-position design for automatic operation. Unfortunately, the two-position designs lacks the requisite closed position to allow the piston rod to be held at the intermediate travel. The three-position design, on the other hand, often includes a biasing element (e.g., a spring) that causes the spool to locate, or default, to the closed position from either of the open positions. This feature typically requires the solenoids to remain energized on the three-position design in order to maintain the spool in either of the open positions, which may not be desirable.

Due to the limitations of existing technology mentioned above, fluid systems need to combine multiple spool valves to achieve the dual-functions for manual operation and automatic operation. The resulting system would include, for example, one two-position spool valve for automated operation and one three-position spool valve for manual operation. This construction can add costs to incorporate the different-types of spool valves as well as complexity to the overall design of the system in the form of additional peripheral items (e.g., pipes, tubes, valves, etc.).

BRIEF DESCRIPTION OF THE INVENTION

This disclosure describes embodiments of a directional valve assembly that combines the functionality of a two-position design for automated operation with the functionality of the three-position design for manual operation in a single device. As set forth more below, the embodiments can include a housing with a piston chamber and a spool member that transits in the housing to regulate the flow of a working fluid to the cylinder. The spool member can have three positions, i.e., two open positions and a closed position. For manual operation, the embodiments may include a lever to transmit a force to the spool to cause the spool to move between the open and closed positions. To achieve automated operation, the embodiments can also have a pilot operator that regulates the flow of pilot air into the piston chamber. The pilot air pressurizes the piston chamber to move the spool. In one embodiment, the pilot assembly may include one or more pilot operators (e.g., solenoid valves) that undergo a momentary change of state, e.g., from a first state in which the piston chamber is pressurized to change the position of the spool between the open positions to a second state in which the piston chamber is de-pressurized.

Notably, unlike conventional three-position designs, the embodiments of the present application do not default to the closed position. The spool member will instead remain in any of the positions with the pilot operators in the second state. This configuration does not require the pilot operators to be continuously energized to maintain the spool member in either of the open positions. This feature affords the proposed design with dual-functionality, i.e., that of conventional two-position and three-position designs, depending on the method of operation. In practical application, embodiments that deploy the proposed design avoid the need to incorporate valve assemblies of different designs to provide these different functions to operate an actuator in a system.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION

Figure 1:
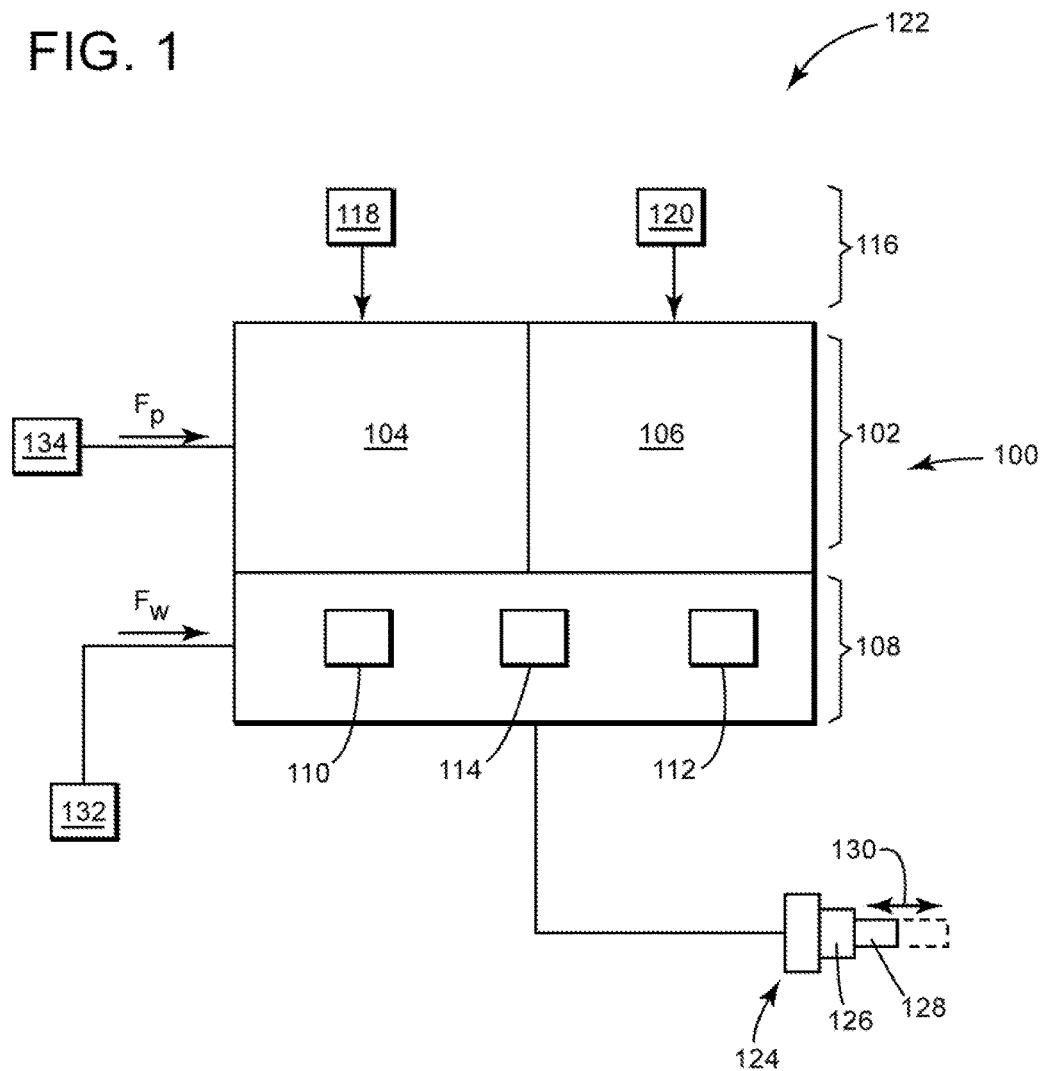
FIG. 1 depicts a schematic diagram of an exemplary embodiment of a valve assembly for use to manually and automatically control the position of a piston on a cylinder.

FIG. 1 depicts a schematic diagram of an exemplary embodiment of a valve assembly 100. The valve assembly 100 includes an operator 102 with a first operator 104 and a second operator 106. The valve assembly 100 also includes an actuating member 108 that can move among a plurality of positions (e.g., a first position 110, a second position 112, and a third position 114) in response to an input 116 (also "outside stimulus") impressed on the operator 102. The input 116 includes a first input 118 and a second input 120. As shown in FIG. 1, the valve assembly 100 is part of a system 122. Examples of the system 122 can include an actuator 124 with a cylinder 126 and a piston rod 128 that can extend and retract, as generally denoted by the arrow enumerated 130. The system 122 can also include one or more fluid supplies (e.g., a working fluid supply 132 and a pilot supply 134) that provide, respectively, a working fluid FW and a pilot fluid FP to the valve assembly 100.

During operation, the valve assembly 100 regulates the flow of the working fluid FW to the actuator 124 to cause the piston rod 128 to extend and retract relative to the cylinder 126. The valve assembly 100 can embody directional control valves including spool valves that incorporate a spool (e.g., the actuating member 108) that moves between various positions in a housing. Unlike conventional three-position spool valves, however, the spool in the valve assembly 100 is not biased to default to any one position. The valve assembly 100 is instead configured for the spool to remain any of the first position 110, the second position 112, and the third position 114 in the absence of the outside stimulus.

The operators 104, 106 effectuate movement of the actuating member 108 to achieve the automated and manual operation of the actuating device 124. In one implementation, the input 116 stimulates one of the first operator 104 and the second operator 106, which in turn causes the actuating member 108 to transit to one of the positions 110, 112, 114. These positions include two open positions (e.g., the first position 110 and the second position 112) and a closed position (e.g., the third position 114) interposed between the two open positions 110, 112. The closed position 114 prevents the flow of working fluid FW to the actuating device 124. On the other hand, the open positions 110, 112 allow the working fluid FW to flow to the actuating device 124 to extend and retract the piston rod 128 relative to the cylinder 126.

The first input 118 can embody an electrical stimulus (e.g., current, voltage, etc.) that stimulates the first operator 104 to change state, e.g., between a first state and a second state to regulate movement of the actuating member 108. Generally, the electrical signal stimulates the first operator 104 for a defined duration. In one embodiment, the defined duration describes the time necessary for the actuating member 108 to move from the first position 110 to the second position 112, and vice versa.

The states of the first operator 104 regulate the flow of the pilot fluid FP into the valve assembly 100. The first state, for example, configures the first operator 104 to allow the pilot fluid FP to pressurize the valve assembly 100 to move the actuating member 108 between the first position 110 and the second position 112. The second state configures the first operator 104 to prevent the pilot fluid FP from pressurizing the valve assembly 100 so as not to stimulate movement of the actuating member 108. In one implementation, the actuating member 108 is configured to remain in either the first position 110 or the second position 112 with the first operator 104 in the second state.

The second input 120 may embody an external force on the second operator 106. This external force manipulates the second operator 106 to move the actuating member 108 between the positions 110, 112, 114 and, thus, extend and retract the piston rod 128. Examples of the external force may arise from an end user, although this disclosure does contemplate various configurations of the system 122 that can include various robotic and/or automated devices that can generate the external force.

Manipulation of the actuating member 108 among the open positions and the closed position modulates the flow of the working fluid FW to the actuator 124. The working fluid FW acts on a piston (not shown), inside the cylinder 126 and connected to the piston rod 128 to move the piston rod 128 relative to the cylinder 126. In one implementation, the actuator 124 has one or more operating modes, e.g., a first operating mode and a second operating mode, that define the travel 130 that the piston rod 128 undergoes in response to operation of the valve assembly 100. The travel 130 in the first operating mode can define two displacements for the piston rod 128 relative to the cylinder 126. In this mode, the piston rod 128 may move from a minimum displacement to a maximum displacement, and vice versa. The travel 130 in the second operating mode may correspond to manual operation of the valve assembly 100. This type of operation regulates the flow of the working fluid FW to cause the piston rod 128 to assume any displacement position relative to the cylinder 126. This mode is consistent with gradual and/or incremental changes to the position of the piston rod 128 relative to the cylinder 126.

The configurations for the valve assembly 100 enable dual-functionality on a single device. As noted herein, the valve assembly 100 can function as a two-position valve when operated electrically and function as a three-position valve when operated manually. In one implementation, under electrical operation (i.e., in response to an electrical stimulus), the spool moves directly between the first position 110 and the second position 112, effectively bypassing the third position 114 because the spool is not biased to any one of the positions 110, 112, 114. This configuration requires only a momentary pulse of electrical stimulus to cause the spool to move between the first position 110 and the second position 112. On the other hand, under manual operation (i.e., in response to outside stimulus on a lever), the spool can be positioned at, and will remain at, any one of the positions 110, 112, 114 in the absence of the electrical stimulus. This configuration offers a single device that combines the benefits of a two-position spool valve and a three-position spool valve, depending on whether the device is operated electrically or manually.

Figure 2:
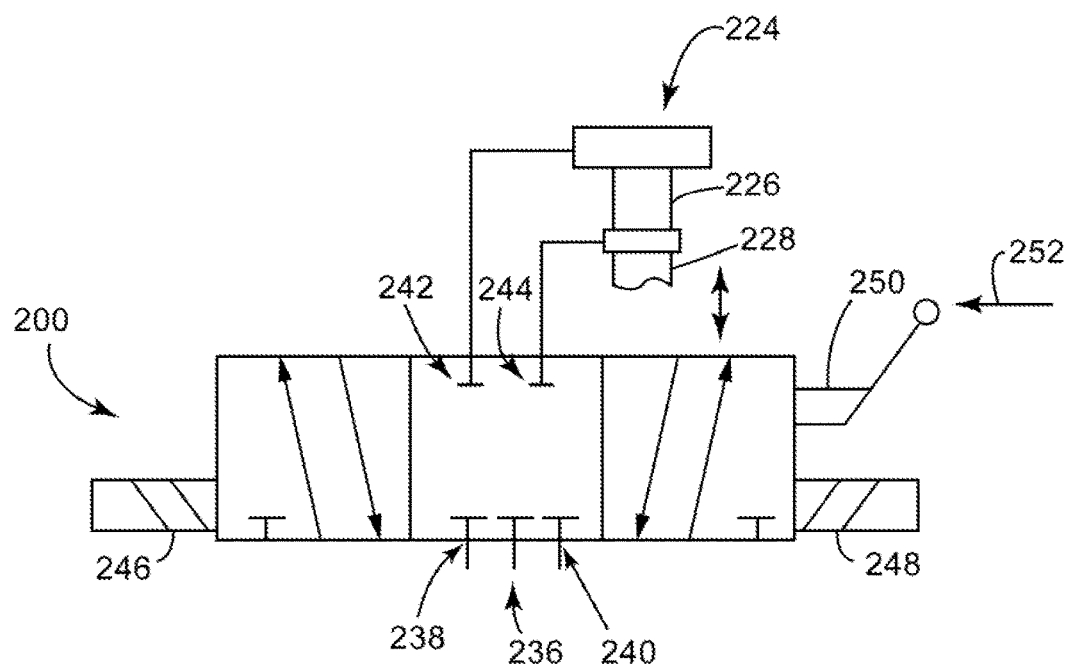
FIG. 2 depicts a schematic diagram of an exemplary embodiment of a valve assembly.

FIG. 2 illustrates a schematic diagram of an exemplary embodiment of a valve assembly 200. The valve assembly 200 has an inlet port 236 and one or more exhaust ports (e.g., a first exhaust port 238 and a second exhaust port 240). The valve assembly 200 also has one or more outlet ports (e.g., a first outlet port 242 and a second outlet port 244) that couple with corresponding inlets on the cylinder 226. Examples of the ports 236, 238, 240, 242, 244 can incorporate threads (e.g., NPT threads) that are compatible with connectors and related connection devices, e.g., that permit the flow of fluids (e.g., liquid and gas). As also shown in FIG. 2, the valve assembly has a pilot operator assembly with a first pilot operator 246 and a second pilot operator 248. The valve assembly 200 also incorporates a manual operator 250 (e.g., a lever) that can receive a manual input 252.

Examples of the pilot operators 246, 248 change state in response to the presence and absence of the outside stimulus (e.g., an electrical stimulus). These states modulate the flow of pilot fluid FP (FIG. 1) into the valve assembly 200 to change the position of the spool (not shown). During operation, configuring the spool in one of the open positions couples the inlet port 236 with one of the outlet ports 242, 244. These configurations can simultaneously allow fluid to exhaust from the actuator via one of the exhaust ports 238, 240 to extend and retract the piston rod 228 relative to the cylinder 226. In one implementation, the presence of the electrical stimulus on the first operator 246 will configure the spool in a first position (e.g., first position 110 of FIG. 1) to couple the inlet port 236 with the first outlet port 242 and the second outlet port 244 with the exhaust port 240. On the other hand, the presence of the electrical stimulus on the second operator 248 will configure the spool in a second position (e.g., second position 112 of FIG. 1) to couple the inlet port 236 with the second outlet port 244 and the first outlet port 242 with the exhaust port 238. Use of the manual operator 250 can also position the spool at a third position (e.g., third position 114 of FIG. 1). This third position configures the spool to effectively prevent fluid flow to/from the valve assembly 200, i.e., the third position decouples the inlet port 236 and exhaust ports 238, 240 from the outlet ports 242, 244.

Notably, operation of the valve assembly 200 by energizing the operators 246, 248 moves the spool directly between the first position and the second position (e.g., the open positions). The spool in the valve assembly 200 is further configured to remain in one of the first position, the second position, and/or the third position when the operators are de-energized, i.e., the spool does not reset or default to any particular position. Rather, in this embodiment, the spool can only assume the third position (i.e., the closed position) under operation of the manual operator 250. This feature effectively combines the functionality of a two-position valve for automatic operation and a three-position valve for manual operation on a single device.

Figure 3:
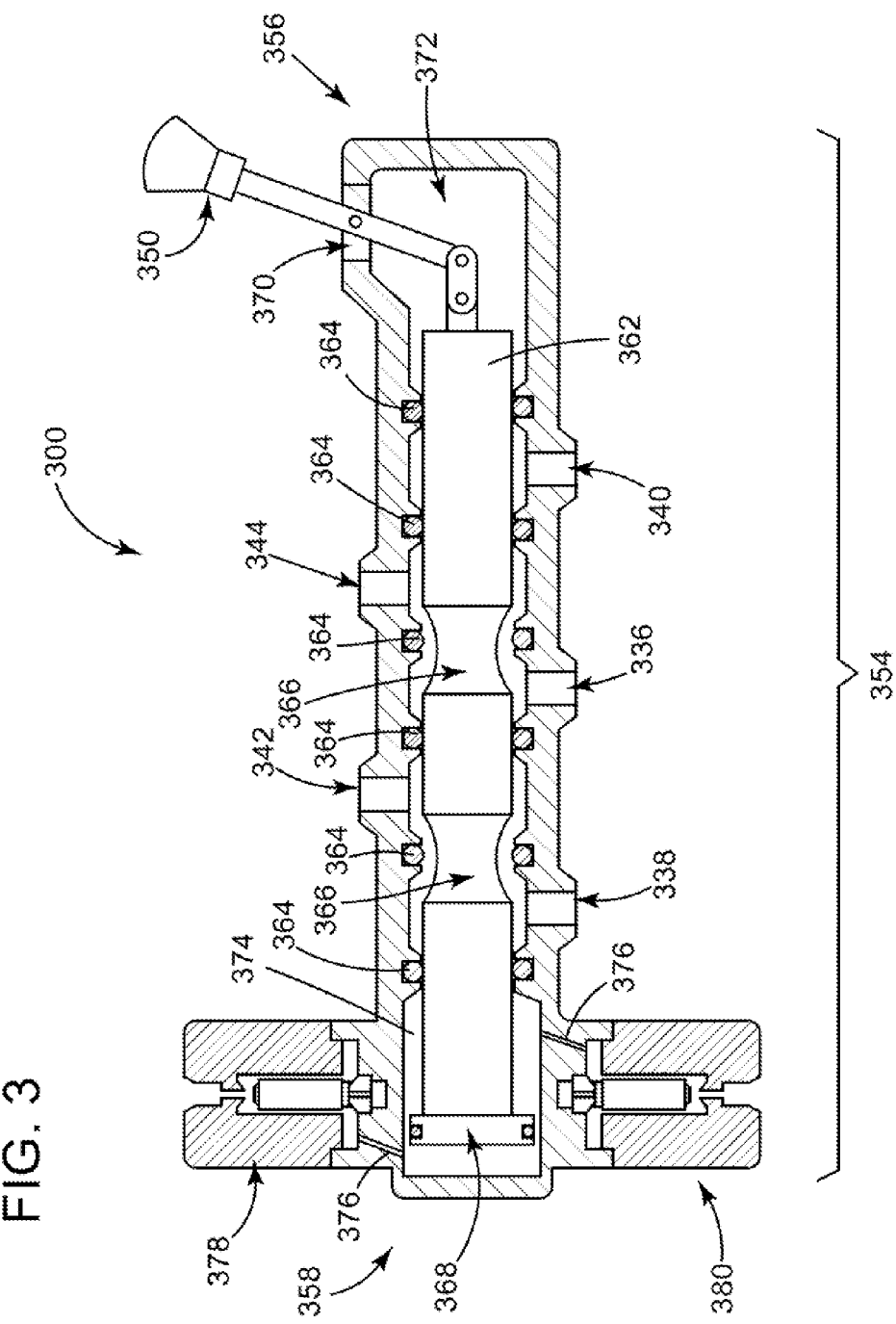
FIG. 3 depicts an elevation, cross-section of an exemplary embodiment of a valve assembly.

FIG. 3 illustrates an elevation, cross-section view of an exemplary embodiment of a valve assembly 300. The valve assembly 300 includes a housing 354 with a first end 356, a second end 358, and an inner chamber formed therein. Inside of the inner chamber, the valve assembly 300 includes a spool member 362 and one or more annular seal members 364. The spool member 362 has one or more recessed areas 366 and a piston end 368. At the first end 356, the housing 354 has an opening 370 to receive the lever 350 therein. The valve assembly 300 can include a linkage 372 that couples the lever 350 to the spool member 362. At the second end 358, the inner chamber enlarges to form a piston chamber 374 in flow connection with the pilot operator via pilot inlets 376. In one embodiment, the pilot operator includes one or more solenoids (e.g., a first solenoid 378 and a second solenoid 380).

As noted above, when the valve assembly 300 operates using the pilot operator, the spool member 362 transits the inner chamber between the open positions found at each end of travel of the spool member 362. These open positions configure the recessed areas 366 in position to couple the inlet 336 with one of the outlets 342, 344.and/or one of the exhausts 338, 340. However, the solenoid valves 378, 380 do not need to be continuously energized in order to maintain the spool member 362 in either of the open positions. The configuration of the valve assembly 300 allows the spool member 362 to move rapidly to either of the open positions, e.g., the first open position that couples the inlet 336 with the outlet 342 and the second position that couples the inlet 336 with the outlet 344. This feature affords the valve with functionality to operate a cylinder to move a piston rod between maximum displacement and minimum displacement, depending on which of the solenoid operators 378, 380 was last energized.

Moreover, the configuration of the valve assembly 300 also allows an end user to adjust the travel of the piston rod with the lever 350. For example, an end user can manipulate the lever 350 to move the spool element 362 to either of the open positions to change the travel of the piston rod. When the piston reaches a desired travel, the end user can manipulate the lever 350 to move the spool element 362 to the closed position, which prevents further movement of the piston rod and, effectively, holds the position of the piston rod in the cylinder. This feature provides additional functionality when operating the valve 300 manually because the piston rod of the cylinder (and, in one example, any device the cylinder can actuate) can be held at any point in its motion between maximum travel and minimum travel.

In view of the foregoing, the embodiments of the valve assembly disclosed herein afford robust functionality for use in system designs that may, for example, wish to leverage the momentary pulse solenoid actuation of a two-position spool valve with the manual operation of a three-position spool valve to locate the spool in a central, closed position.

As used herein, an element or function recited in the singular and preceded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A spring-less valve assembly, comprising:
   a housing forming an inner chamber;
   annular seal members disposed in the inner chamber;
   a spool member disposed in the inner chamber, the spool member having a lever end and a piston end on opposite ends, the spool member having a body with an enlarged portion at the piston end that gives way to an elongated, cylindrical portion having a diameter that is smaller than the diameter of the enlarged portion, the elongated, cylindrical portion contacting the annular seal members and terminating at the lever end, wherein the piston end is configured to translate the spool member in response to pilot fluid and the lever end is configured to translate the spool member in response to manual input among a first position, a second position, and a third position disposed between the first position and the second position;

a first operator configured to regulate the pilot fluid to either side of the enlarged portion at the piston end so as to change the position of the spool element between the first position and the second position, the first operator comprising a first pilot operator and a second pilot operator, each having a first state and a second state; and a second operator configured to change the position of the spool element between the first position, the second position, and the third position, wherein the first pilot operator and the second pilot operator are configured to assume the first state in response to an electrical stimulus and to assume the second state in the absence of the electrical stimulus, and wherein the spool member is configured to remain in each of the first position, the second position, and the third position with both the first pilot operator and the second pilot operator in the second state, with the elongated, cylindrical portion spaced apart from the housing inside of the inner chamber, and with the spool member disengaged from any parts of the housing disposed longitudinally away from the lever end beyond the enlarged portion of the body of the spool member.

2. The valve assembly of claim 1, wherein the second operator is configured to transfer a manual input to the spool element to move the spool element between the first position, the second position, and the third position.

3. The valve assembly of claim 1, wherein the housing comprises an inlet port, one or more exhaust ports, and one or more outlet ports, wherein the third position configures the spool member to prevent flow between the inlet port, the one or more exhaust ports, and the one or more outlet ports.

4. The valve assembly of claim 3, wherein one or more exhaust ports comprise a first exhaust port and a second exhaust port, wherein the one or more outlet ports comprise a first outlet port and a second outlet port, and wherein the first position configures the spool member to connect the inlet port and the first outlet port and to connect the second outlet port with the second exhaust port.

5. The valve assembly of claim 4, wherein the second position configures the spool member to connect the inlet port to the second outlet port and to connect the first outlet port to the first exhaust port.

6. The valve assembly of claim 1, wherein the inner chamber comprises a plurality of chambers including a piston chamber, and wherein the first operator is configured to couple the piston chamber to atmosphere in the second state.

7. A spring-less spool valve, comprising:
a housing with an inner chamber forming a first chamber and a second chamber, an inlet port, and one or more outlet ports, each of the inlet port and the one or more outlet ports coupled with the first chamber;
annular seal members disposed in the inner chamber;
a spool member disposed in the inner chamber, the spool member having a lever end and a piston end on opposite ends, the spool member having a body with an enlarged portion at the piston end that gives way to an elongated, cylindrical portion having a diameter that is smaller than the diameter of the enlarged portion, the elongated, cylindrical portion contacting the annular seal members and terminating at the lever end, wherein the piston end is configured to translate the spool member in response to pilot fluid and the lever end is configured to translate the spool member in response to manual input among a first position, a second position, and a third position in the first chamber, wherein, in the first position and the second position, the spool member is configured to couple the inlet port with the plurality of outlet ports, and wherein, in the third position, the spool member is configured to decouple the inlet port and the plurality of outlet ports;

a pair of pilot operators configured to regulate the pilot fluid to either side of the enlarged portion at the piston end so as to change the position of the spool member in response to a first input; and a lever configured to change the position of the spool member in response to a second input, which is different from the first input, wherein the spool member is configured to remain in one of the first position, the second position, and the third position in the absence of the first input, with the elongated, cylindrical portion spaced apart from the housing inside of the inner chamber, and with the spool member disengaged from any parts of the housing disposed longitudinally away from the lever end beyond the enlarged portion of the body of the spool member.

8. The spool valve of claim 7, wherein the lever couples with the spool member, wherein the lever is configured to transmit the second input to the spool member to change the position of the spool member between the first position, the second position, and the third position.

9. The spool valve of claim 7, wherein the first input comprises an electrical stimulus, wherein the pair of pilot operators comprises a first solenoid and a second solenoid coupled with the second chamber, wherein the first solenoid and the second solenoid are each operative in a first state in response to the electrical stimulus that configures the spool member in one of the first position and the second position.

10. The spool valve of claim 9, wherein the first solenoid and the second solenoid are operative in a second state, which is different from the first state, and wherein the second state corresponds to the absence of the electrical stimulus.

11. The spool valve of claim 10, wherein the first solenoid and the second solenoid are configured to couple the second chamber to atmosphere in the second state.

12. The spool valve of claim 7, wherein the third position is interposed between the first position and the second position.

13. A system, comprising:
a pneumatic actuator with a piston rod having a first travel and a second travel that is different from the first travel;
a spring-less valve assembly configured to couple with the pneumatic actuator, the valve assembly comprising,
a housing with an inner chamber,
annular seal members disposed in the inner chamber,
a spool member disposed in the housing, the spool member having a lever end and a piston end on opposite ends, the spool member having a body with an enlarged portion at the piston end that gives way to an elongated, cylindrical portion having a diameter that is smaller than the diameter of the enlarged portion, the elongated, cylindrical portion contacting the annular seal members and terminating at the lever end, wherein the piston end is configured to translate the spool member in response to pilot fluid and the lever end is configured to translate the spool member in response to manual input, and a first operator and a second operator that are configured to move the spool member between a first position, a second position, and a third position in the housing, wherein the first operator is configured to regulate the pilot fluid to either side of the enlarged portion at the piston end so as to change the position of the spool element between the first position and the second position, wherein the first operator comprises a first pilot operator and a second pilot operator, each having a first state and a second state that correspond with, respectively, the presence and the absence of an electrical stimulus on one or more of the first pilot operator and the second pilot operator, and wherein the spool member is configured to remain in one of the first position, the second position, and the third position with the first pilot operator and the second pilot operator in the second state, with the elongated, cylindrical portion spaced apart from the housing inside of the inner chamber, and with the spool member disengaged from any parts of the housing disposed longitudinally away from the lever end beyond the enlarged portion of the body of the spool member.

14. The system of claim 13, wherein the valve assembly comprises a second operator that is configured to move the spool member in response to a manual input.

15. The system of claim 14, wherein the second operator is configured to move the spool member between the first position, the second position, and the third position with the first pilot operator and the second pilot operator in the second state.

16. The system of claim 15, wherein the first operator is configured to move the spool element between the first position and the second position in response to the electrical stimulus.

17. The system of claim 13, wherein the valve assembly is configured to couple with a pressurized supply, wherein the first position and the second position of the spool member configure the valve assembly to allow fluid from the pressurized supply to flow to a first side of the pneumatic cylinder and to exhaust from a second side of the pneumatic cylinder.

18. The system of claim 17, wherein the third position of the spool member configures the valve assembly to prevent fluid from the pressurized supply to flow to the first side of the pneumatic cylinder and to exhaust from the second side of the pneumatic cylinder.

19. The system of claim 13, wherein the housing comprises an inlet port, one or more exhaust ports, and one or more outlet ports, wherein the third position configures the spool member to prevent flow between the inlet port, the one or more exhaust ports, and the one or more outlet ports.

20. The system of claim 19, wherein the one or more exhaust ports comprise a first exhaust port and a second exhaust port, wherein the one or more outlet ports comprise a first outlet port and a second outlet port, wherein the first position configures the spool member to connect the inlet port and the first outlet port and to connect the second outlet port with the second exhaust port, and wherein the second position configures the spool member to connect the inlet port to the second outlet port and to connect the first outlet port to the first exhaust port.

* * * * *